United States Patent
Kim et al.

(10) Patent No.: US 8,880,511 B2
(45) Date of Patent: Nov. 4, 2014

(54) DATABASE QUERY OPTIMIZATION AND COST ESTIMATION

(71) Applicant: TIBCO Software Inc., Palo Alto, CA (US)

(72) Inventors: Tom Kim, Cupertino, CA (US); Firat Kart, San Jose, CA (US); Suresh Subramani, San Jose, CA (US)

(73) Assignee: TIBCO Software Inc., Palo Alto, CA (US)

( * ) Notice: Subject to any disclaimer, the term of this patent is extended or adjusted under 35 U.S.C. 154(b) by 18 days.

(21) Appl. No.: 13/685,489

(22) Filed: Nov. 26, 2012

(65) Prior Publication Data

US 2013/0138679 A1 May 30, 2013

Related U.S. Application Data

(60) Provisional application No. 61/563,728, filed on Nov. 25, 2011.

(51) Int. Cl.
*G06F 7/00* (2006.01)
*G06F 17/30* (2006.01)

(52) U.S. Cl.
CPC .... *G06F 17/30979* (2013.01); *G06F 17/30474* (2013.01); *G06F 17/30961* (2013.01)
USPC .......................................... 707/719; 707/797

(58) Field of Classification Search
None
See application file for complete search history.

(56) References Cited

U.S. PATENT DOCUMENTS

| 4,575,798 | A * | 3/1986 | Lindstrom et al. ..................... 1/1 |
| 6,510,422 | B1 | 1/2003 | Galindo-Legaria et al. |
| 7,213,012 | B2 * | 5/2007 | Jakobsson ............................. 1/1 |
| 7,636,735 | B2 | 12/2009 | Haas et al. |
| 8,019,751 | B2 * | 9/2011 | Baccash et al. ............... 707/719 |
| 8,285,711 | B2 * | 10/2012 | Bordawekar et al. ......... 707/718 |
| 2004/0220923 | A1 | 11/2004 | Nica | |
| 2007/0050330 | A1 | 3/2007 | Karn et al. | |

FOREIGN PATENT DOCUMENTS

KR   10-2010-0114664   10/2010

OTHER PUBLICATIONS

Manolopoulos et al. ("R-trees have grown everywhere", Technical Report, 2003).*
Bentley et al., "Data Structures for Range Searching", Computing Surveys, vol. 11, No. 4, 1979, ACM.*
Sellis et al., "The R+ Tree: A Dynamic Index for Multi-Dimensionsl Objects", Carnegie Mellon University, Computer Science Department, Research Showcase, Paper 566, 1987.*
Getoor et al., "Selectivity Estimation using Probabilistic Models", ACM SIGMOD 2001, pp. 461-472, 2001, ACM.*
Ciaccia et al., "A Cost Model for Similarity Queries in Metric Spaces", PODS 98, pp. 59-68, 1998, ACM.*
Poosla et al., "Improved Historgrams for Selectivity Estimation of Range Predicates", SIGMOD '96, pp. 294-305, 1996, ACM.*
PCT/US2012/066551, Search Report and Written Opinion of the International Searching Authority mailed Feb. 18, 2013.

* cited by examiner

*Primary Examiner* — Michael Hicks
(74) *Attorney, Agent, or Firm* — Baker & McKenzie LLP

(57) ABSTRACT

Described are systems and methods relating to database query optimization and query cost estimation. The approach is described in the context of searching balanced and semi-balanced tree indexes such as B-trees, B+ trees, and R-B trees. The described approach may be used for both simple and composite queries, and the described approach may be used for relational queries, i.e., where a variable is less than or greater than a certain value and the database is being used to find the set of records that satisfy the relation. Further, the described approach may be used for generalized N-ary tree queries and cost estimations.

20 Claims, 9 Drawing Sheets

FIG. 4

```
(lt_count, gt_count) cost (key)
{
        node = tree.head;
        int lt_count = 0; // entries less than key
        int gt_count = 0; // entries greater than key
        int lt = 0; // entries less than key for the current level
        int gt = 0; // entries greater than key for the current level
        while (node ! = null)
        {
                if (key < node.key)
                {
                        lt = lt * 2;
                        gt = gt * 2 + 1;
                        node = node.left;
                }
                else
                {
                        lt = lt * 2 + 1;
                        gt = gt * 2;
                        node = node.right;
                } lt_count += lt;
                gt_count += gt;
        }
        // normalization
        //
        int_sum = lt_count + gt_count;
        if (sum ! = 0)
        {
                lt_count = lt_count * (tree.size / sum);
                gt_count = gt_count  * (tree.size / sum);
        }
        return (lt_count, gt_count);
}
```

```
(lt_count, gt_count) cost (key)
{
        node = tree. head;
        int lt_count = 0; // entries less than key
        int gt_count = 0; // entries greater than key
        int lt = 0; // entries less than key for the current level
        int gt = 0; // entries greater than key for the current level
        int l;

while (node ! = null)
        {
                for (l = 0; l < n; i++)
                        if (key > node[i].key) break;

lt = (lt * n) + i;
                gt = (gt * n) + (n - (i + 1));

lt_count += lt;
                gt_count += gt;

node = node.[i];
        }
        // normalization
        //
        int_sum = lt_count + gt_count;
        if (sum ! = 0)
        {
                lt_count = lt_count * (tree.size / sum);
                gt_count = gt_count * (tree.size / sum);
        }
        return (lt_count, gt_count);
}
```

FIG. 11

DATABASE QUERY OPTIMIZATION AND COST ESTIMATION

CROSS-REFERENCE TO RELATED APPLICATIONS

This patent application relates and claims priority to provisional patent application No. 61/563,728, entitled "Improved database query optimization and cost estimation," filed Nov. 25, 2011, which is herein incorporated by reference for all purposes.

TECHNICAL FIELD

The system and method disclosed herein relates to database query optimization. The system and method includes computer-readable instructions stored on a computer-readable medium for providing a database query cost estimation and thereby further optimizing queries. The approach is described in the context of searching balanced and semi-balanced tree indexes such as B-trees, B+ trees, and R-B trees. The described approach may be used for both simple and composite queries, and the described approach may be used for relational queries, i.e., where a variable is less than or greater than a certain value and the database is being used to find the set of records that satisfy the relation. Further, the described approach may be used for generalized N-ary tree queries and cost estimations.

BACKGROUND

A query optimizer is a component of a database management system that attempts to determine the most efficient way to execute a query. The optimizer considers the possible query plans for a given query and attempts to determine which of those plans will be the most efficient. Cost-based query optimizers assign an estimated "cost" to each possible query plan and select the plan with the smallest cost. Costs are used to estimate the runtime cost of evaluating the query, in terms of the number of I/O operations required, the CPU requirements, and other factors determined from the database.

Systems using histograms for cost-based query optimization suffer from efficiency problems when using a higher resolution and are error-prone when using a lower resolution. What is needed is a reliable cost estimation without the efficiency and error penalties associated with histograms.

BRIEF SUMMARY

The disclosed system and method provides an approach for quickly and accurately planning the order of evaluation for queries. To efficiently perform queries on a database, indexes may be specified by a database administrator and pre-computed. To support range queries, a balanced or semi-balanced tree is typically used. The balanced tree may provided a cost estimation of sub-queries by traversing the tree as if executing the query and keeping a running estimate of the number of entries that are less-than and greater-than a specified key.

The disclosed system and method also provides an approach for quickly and accurately estimating the cost of composite query clauses by utilizing existing balanced tree indexes. The system and method also provides an approach for handling duplicate entries in balanced tree indexes.

BRIEF DESCRIPTION OF THE DRAWINGS

Reference is now made to the following detailed description of the preferred embodiments, taken in conjunction with the accompanying drawings. In addition, it is emphasized that some components are omitted in certain figures for clarity of discussion. Reference is now made to the following descriptions taken in conjunction with the accompanying drawings, in which.

These exemplary figures and embodiments, along with the exemplary figures that are included in the body of this provisional patent application, are to provide a written, detailed description of the inventions set forth by any claims that issue from the present application. These exemplary figures and embodiments should not be used to limit any claims that ultimately issue in a patent from the present application.

DETAILED DESCRIPTION

Query optimization approaches attempt to determine the most efficient way to execute a query by considering multiple possible query plans for a given input query and determining which of those plans would be the most efficient. Cost-based query optimizers assign an estimated "cost" to each possible query plan and choose the plan with the smallest cost. Costs are used to estimate the runtime cost of evaluating the query in terms of the number of I/O operations required, the CPU requirements, and other factors determined by the systems in which such optimizers are run.

Previous database systems have often used histograms to calculate query cost estimations because such histograms can be managed with minimal overhead and have a small memory footprint. A histogram consists of tabular frequencies, shown as adjacent rectangles, erected over discrete intervals (bins), with an area equal to the frequency of the observations in the interval. The height of a rectangle is equal to the frequency density of the interval, i.e., the frequency divided by the width of the interval, and the total area of the histogram is equal to the total number of samples.

Unfortunately, such prior art histogram approaches can produce cost estimations that are incorrect by a wide degree because their preciseness is limited by histogram granularity. Thus, there is a tension between the size of the bins and the cost of the query. The larger the bins, the less the query costs, but the greater the possibility of error. With smaller bins, the possibility of error is greatly reduced, but the cost of the query may be greatly increased. For example, suppose there are one million total samples for units 1, 2, 3, 4, and 5 and only ten total samples for units 6, 7, 8, 9, and 10. If the histogram bin size is ten and there is one bin for units 1 through 10, then any query for a key for any one of these unit values will return a count of 1,000,010. This is reasonably accurate for a key for unit values 1 through 5, but highly inaccurate for a key for unit values 6 through 10. The present system and method provides a more efficient and accurate system for indexing and searching index values than the histogram method described above.

Figure 1:
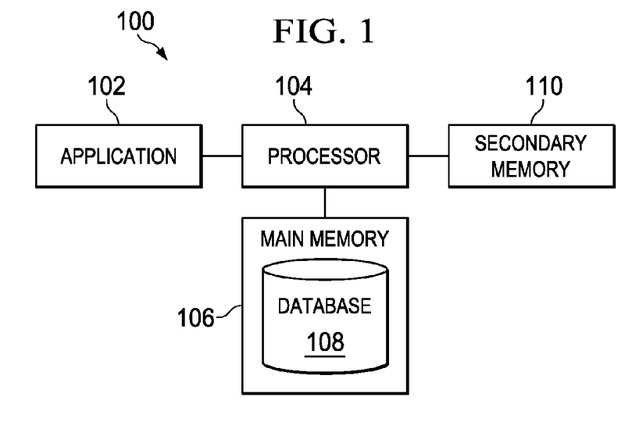
FIG. 1 is a schematic diagram of an example system for improved query cost estimation, in accordance with the present disclosure.

FIG. 1 is a schematic diagram of an example system 100 for improved query cost estimation. The system 100 comprises a processor 104 in connection with an application 102, main memory 106, and secondary memory 110. A database 108 is located within the main memory 106, and the database 108 may be an in-memory database or a main memory database system. The described system and method uses a balanced or semi-balanced tree index of the database for database queries and cost estimation. Such tree-structured indexes might be cost-prohibitive in a disk-based database system because of multiple disk reads, whereas this approach may be more particularly effective in an in-memory database system. An advantage of using such a tree structured approach is that it is not generally an abstraction of the database information, but actually an effective ordering of all the data in a database that promotes queries and cost estimates, whereas prior art histograms would inevitably break the data down into ranges having the frequency indicators. Thus, this new approach allows for much more precise estimates.

System 100 may comprise application 102, processor 104, main memory 106, database 108, and secondary memory 110, and may be any suitable computing device or machine comprising a processor and a memory to perform the described functionality. Application 102, processor 104, main memory 106, database 108, and secondary memory 110 may comprise one or more machines, workstations, laptops, blade servers, server farms, and/or stand-alone servers. Application 102, processor 104, main memory 106, database 108, and secondary memory 110 may include any hardware and/or controlling logic used to communicate information to and from one or more elements illustrated in FIG. 1. For example, application 102, processor 104, main memory 106, database 108, and secondary memory 110 may be operable to receive and process data of different types that may be transmitted via different protocols or formats. Other elements in FIG. 1 may also comprise hardware and/or controlling logic to communicate information to and from one or more elements illustrated in FIG. 1.

Query Optimizer for Improved Queries and Cost Estimation

Described herein is a system and method for improved queries and query cost estimation. The query optimizer is implemented through computer-readable instructions stored in a computer readable medium such as main memory 106 and/or secondary memory 110. When the instructions are executed on the processor 104 an optimized method for executing a query is performed. In the context of a composite query, the query optimizer creates a plan that executes the composite query more quickly than merely following the composite query's expressed order. The techniques expressed here are also effective in performing optimization for simple (single variable) relational queries. Compared to a histogram approach, even for a simple relational query, providing a balanced or semi-balanced tree index allows a simultaneous traversal through the tree structure (which includes all of the indexed data) and estimating the values that are relationally less than or greater than the key being tested.

The simple balanced tree structure below shows generally how a relational query through a balanced or semi-balanced tree index proceeds. Such tree structures are designed to branch in ways that provide an organized traversal. For example, below is a simple tree for the set of numbers −1, 2, 3, 4, 5, 6, 7, 8, 9, 10, 11, 12, 13, 15, 16, 17, 18 (14 is missing from a complete sequence from 1-18). There are various algorithms for balancing tree indexes in the way this one was done in order to promote ordered traversal through them. The example below also includes a sample traversal (shown in the dark arrow line) for a "key"<8. At each node, the key can be tested, and an estimate of points satisfying the dataset can be found based on known table properties. In this case, given that it is a perfectly balanced tree, finishing between bottom "leafs" in the third and fourth position on the third level, it can relatively quickly be calculated that approximately 6 total samples are on the "less than" or "LT" side of the tree and approximately 9 total samples are on the "greater than" or "GT" side of the tree. (This number is slightly off, since technically there was a "match" on 8, so 8 would not have been on the "GT" side of the tree.)

Figure 2:
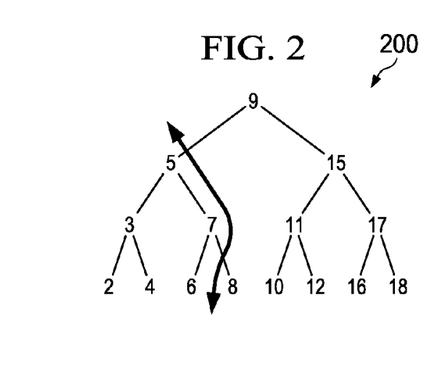
FIG. 2 is a schematic diagram illustrating traversal of a sample tree structure, in accordance with the present disclosure.

FIG. 2 is a schematic diagram illustrating a sample tree structure 200 and a "key<8" traversal of the sample tree structure.

To efficiently perform queries on a database, indexes may be specified by a database administrator via application 102. These indexes are in a process of being balanced and re-balanced to maintain known characteristics and structures, and these structures comprise the tree structures discussed in this document, e.g., red-black tree, B-tree, B+ tree, etc. The balance is to optimize computational time in keeping such indexes balanced and minimizing query time. In other words, for optimal searching and estimation, a perfectly balanced tree index is desirable (as in the example shown above), but maintaining a perfectly balanced tree is very computationally expensive. So instead trees are allowed to become at least partially unbalanced (within certain specified parameters) before rebalancing to reduce the burden of keeping the trees balanced while still keeping the trees within a certain bounded structure.

As a tree becomes unbalanced, the depth of one side of the tree may not equal the depth of the other side of the tree, and the length of the tree then varies depending on the chosen path. The unbalance of the tree would then cause incorrect estimations if balanced-tree assumptions are used. Assume the example provided above, but remove some of the data points to make the tree unbalanced. If the tree were balanced as discussed above, the "LT" side for a "key<8" traversal through the index would result in (as above) the number of "LT" entries being about six and the number of "GT" entries being about nine. But because this tree is unbalanced, the numbers are off, and the GT side number is particularly off, with there only being four entries on the "GT" side of the traversal line.

Figure 3:
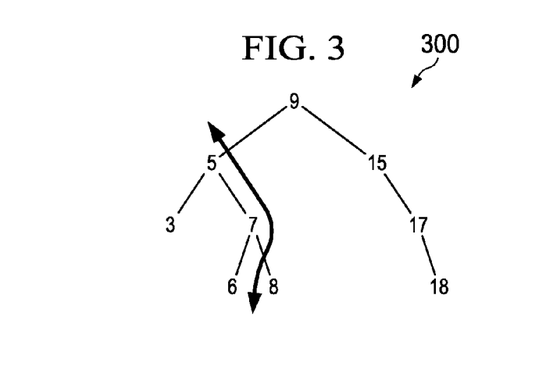
FIG. 3 is a schematic diagram illustrating traversal of a sample out-of-balance tree structure, in accordance with the present disclosure.

FIG. 3 is a schematic diagram illustrating a sample out-of-balance tree structure 300 and a "key<8" traversal of the tree structure 300. As shown in FIG. 3, this tree should be rebalanced for optimal traversal and estimation, and the degree of unbalancing allowed is related to the type of tree structure that is employed.

For purpose of some of the discussions in this application, a red-black tree or RB tree is assumed, but the principles described herein can be applied to other types of trees, including balanced binary trees, semi-balanced binary trees, and other trees. The details of how such trees are balanced and maintained is not important for purposes of this document, but such details are well-known and understood by one of ordinary skill in the art. Basically, such trees are characterized by being reasonably balanced and accordingly reasonably effective for query cost estimation. For example, in a red-black tree, the path from the root of the tree to the farthest leaf is no more than twice as long as the path from the root of the tree to the nearest leaf, which causes the tree to be reasonably balanced. The height of balanced or semi-balanced binary trees are generally going to be a logarithmic value, meaning that the number of levels in the tree is generally going to be low because it is logarithmic of the number of nodes in the tree. These properties of such balanced or semi-balanced binary trees may be important for query cost estimation for several reasons. For example, the cost estimation may be more cost effective because the tree may not be too tall, and the estimates may be reasonably accurate because of the relatively assured balance.

Each node in a balanced binary tree has two leaf nodes—a right leaf node and a left leaf node. Because each level of the tree is limited in size, there are upper and lower bounds on how many nodes may be to the left and to the right of the current node. When traversing through the tree, a ratio of nodes on the left to nodes on the right of the current path is created, and that ratio may then be applied to the actual tree size. Therefore, it is possible to estimate the number of nodes to the left and the number of nodes to the right on each level and keep a running total of the nodes less than (LT) a key and of the nodes greater than (GT) a key. When the tree has been traversed, it is possible to sum the number of nodes less than a key and the number of nodes greater than a key. With the less than and greater than sums, it is possible to estimate, based on the size of the tree, how many matches there may be in a left sub-tree and in a right sub-tree for a particular query.

With an index tree such as a balanced binary tree, a cost estimation of the sub-queries can be computed by traversing the tree as if executing the query while keeping a running estimate of the number of nodes (entries) that are less-than and greater-than the specified key. To perform an accurate query cost estimation, the entire tree may be traversed, even if the specified key is found at a higher level of the tree. It is also possible to "normalize" to get a cost estimation based on the relative count of less-than and greater-than keys and by normalizing this ratio relative to the total size of the tree, whether or not the tree is entirely traversed in the process of seeking a "match" for the key.

Improved Cost Estimation for Composite Queries

In addition to the above-described advantageous approach of using tree indexes for efficient queries through cost estimation and simple relational queries of databases, the described approach can be employed with great advantage to make composite queries of databases more efficient.

A composite query is a query composed of multiple sub-queries connected by operators. For example, a composite query may be "A<100 AND B<100." If there are indexes for A and B and one million entries that satisfy "A<100," but only ten entries that satisfy "B<100," computing the composite query with an index scan may be very inefficient. Computing "A<100" and performing an index scan on the result for "B<100" requires the latter scan to search the one million entries that satisfy "A<100." In contrast, computing "B<100" and performing an index scan on the result for "A<100" only requires the latter scan to search the ten entries that satisfy "B<100." In the example "A<100 AND B<100," there may be separate indexes for queries A and B, and each query may have a key, in this instance "<100 for both A and B." Since the approaches described herein can be performed so efficiently to get a cost estimation of both of the "A" and "B" key queries, the order to follow in computing the composite query may be quickly determined.

A Description of the Method in Pseudo Code and Flowchart Formats

Figure 4:
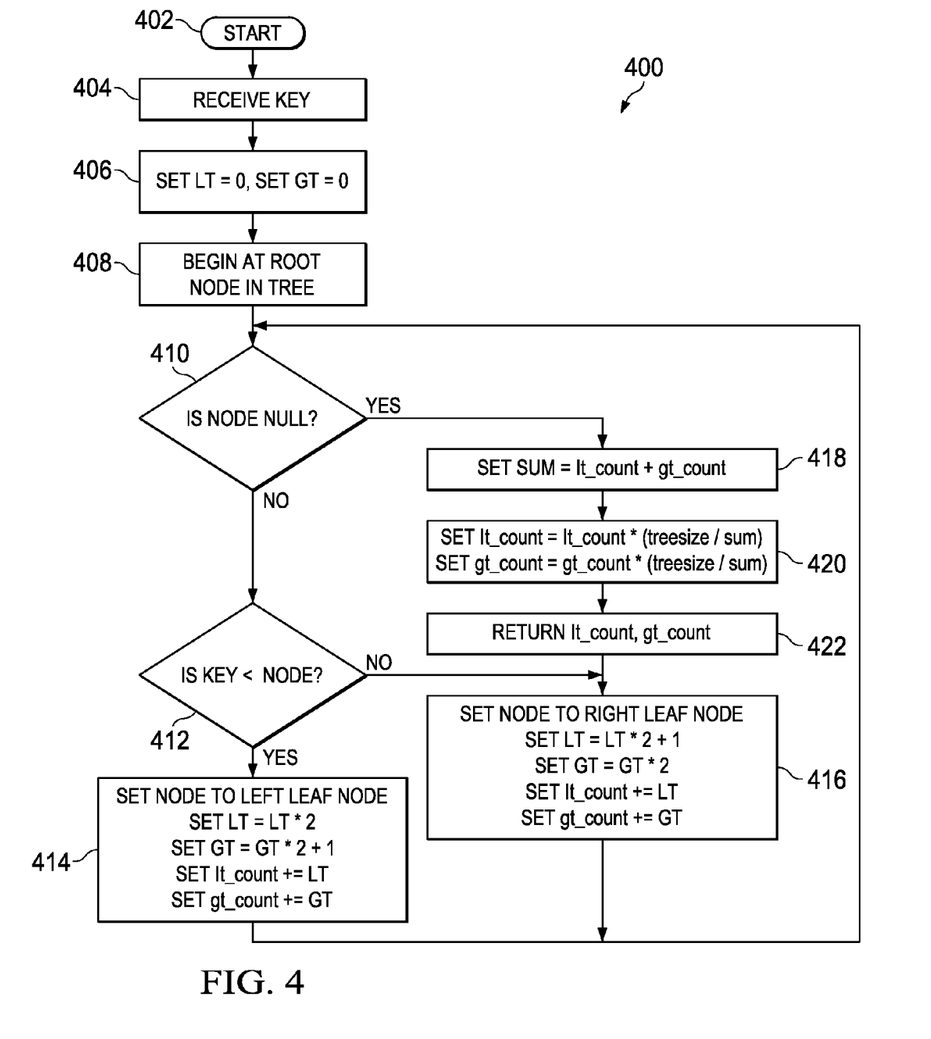
FIG. 4 is an example process for improved query cost estimation, in accordance with the present disclosure.
Figure 5:
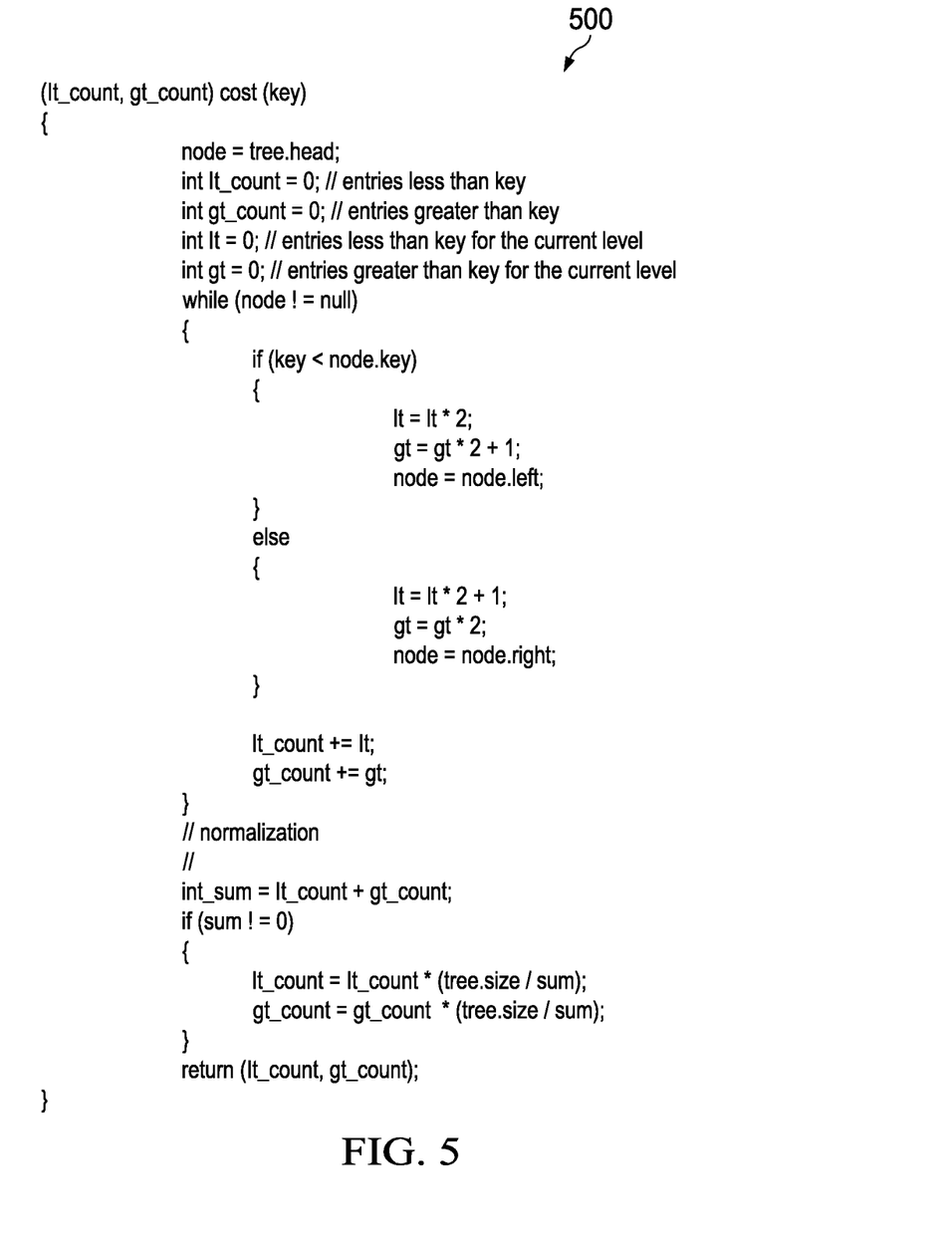
FIG. 5 is an exemplary pseudo code for improved query cost estimation, in accordance with the present disclosure.

FIG. 4 is an example process 400 for improved query cost estimation. FIG. 5 is exemplary pseudo code 500 of the process of FIG. 4 for improved query cost estimation. To best estimate the cost of a query, it is advantageous for the tree to be at least partially balanced, as this allows the number of entries to the left and to the right of the current node position at each level of the tree to be estimated, at least within the bounds of the tree balancing. The more balanced the tree, the better the cost estimation of the query may be. To get a better estimation of the query cost, in described embodiments, the process 400 normalizes the initial calculations against the actual size of the tree, which may become more important when combining multiple passes of the tree in a single equation, as described below in more detail.

At action 402, the process 400 for improved query cost estimation begins. At action 404, a key may be received, wherein the process 400 calculates the cost estimation less than or greater than a value. There may be an index with one query (e.g., A<100), an index with two sub-queries (e.g., A>50 AND A<400), or two indexes with sub-queries (e.g., A<100 AND B<100). At action 406, an integer value for LT and an integer value for GT may both be set to 0. LT is an estimate of the number of entries less than the key (upper bound key). GT is an estimate of the number of entries greater than the key (lower bound key). At action 408, the traversal of the tree begins at a root node in the tree and a current node is set to the root node.

At decision 410, it may determined if the current node is a null node. If the current node is the root node, the current node in the tree is not null. If the current node is not null, at decision 412, it may be determined if the value of the key is less than the value of the current node. If the value of the key is less than the value of the current node, at action 414, the current node is updated so that the new current node is set to the left leaf node of the previous current node, the LT value is updated so that the new LT value is twice the old LT value, and the GT value is updated so that the new GT value equals twice the old GT value plus 1. Internal counts are also updated as follows: lt_count+=lt; gt_count+=gt. The process 400 then returns to decision 410 to determine if the new current node is null.

If the value of the key is greater than the value of the current node, at action 416, the current node is updated so that the new current node is set to the right leaf node of the previous current node, the LT value is updated so that the new LT value is twice the old LT value plus 1, and the new GT value is updated so that the new GT value equals twice the old GT value. Internal counts are also updated as follows: lt_count+=lt; gt_count+=gt. The process 400 then returns to decision 410 to determine if the new current node is null.

At either action 414 or 416, when the process attempts to update the current node and there is no leaf node to the left or to the right of the current node, the current node is set to null. Because the tree is balanced, once a null node is found, a reasonable estimation of the size of the tree may be made, and a reasonable estimation of the cost of the query may also be made. If the current node is null, at action 418, the current lt_count and the current gt_count value are summed. If the sum does not equal 0, at action 420, the results are normalized, and the LT value is updated so that the new LT value equals the old LT value multiplied by the tree size divided by the sum, and the GT value is updated so that the new GT value equals the old GT value multiplied by the tree size divided by the sum. At action 422, the new LT and new GT values are returned and the cost of the query may be estimated based on the tree size.

Figure 6A:
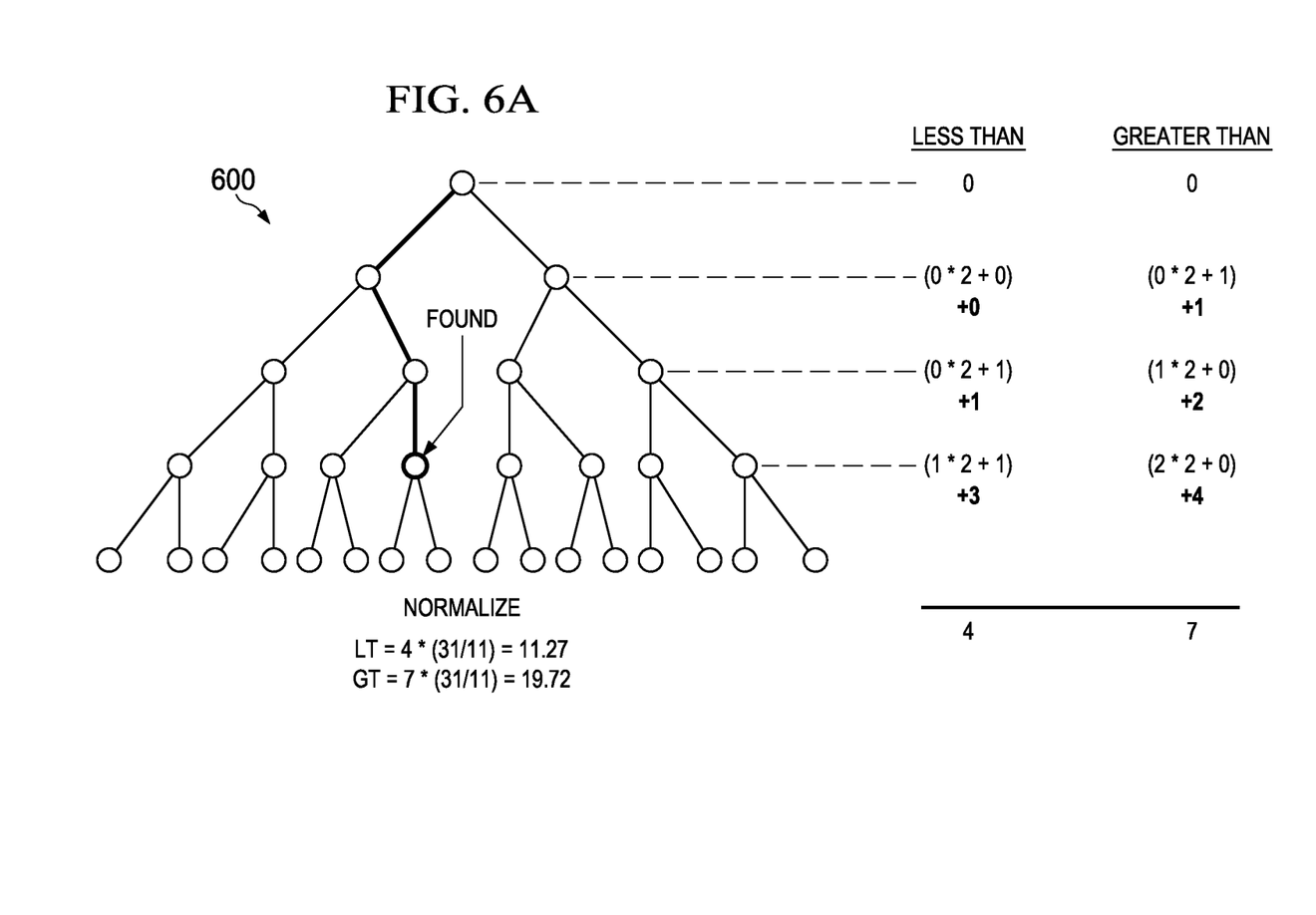
FIGS. 6A-B illustrate an exemplary tree for improved query cost estimation with a single key and a single query, in accordance with the present disclosure.

FIG. 6A is an exemplary tree 600 for the process of FIG. 4 for improved query cost estimation with a single index and a single query. As an example, the tree 600 may be for a single query for "A<100," where the key is A=100. As can be seen in FIG. 6A, at the top level of the tree, the LT and GT values are both set to 0 at the root node.

At the next level while traversing the tree 600, because the key is less than the current node's key, the current node becomes the root node's left leaf node, the LT value is updated to 0 (0*2+0=0), and the GT value is updated to 1 (0*2+1=1). At the first level under the root node, the LT and GT values estimate that there are zero nodes less than the key and one node greater than the key for the query A<100.

At the next level while traversing the tree 600, because the key is greater than the current node's key, the new current node becomes the old current node's right leaf node, the LT value is updated to 1 (0*2+1=1), and the GT value is updated to 2 (1*2+0=2). At the second level under the root node, the LT and GT values estimate that there is one node less than the key and two nodes greater than the key for the query A<100.

At the next level while traversing the tree 600, because the key is greater than the current node's key, the new current node becomes the old current node's right leaf node, the LT value is updated to 3 (1*2+1=3), and the GT value is updated to 4 (2*2+0=4). At the third level under the root node, the LT and GT values estimate that there are three nodes less than the key and four nodes greater than the key for the query A<100. In this instance, as indicated, a "match" was found at the third level, i.e. the "100" node was at this level. At this point, however, the relationship estimate would be particularly incomplete (and inaccurate) because a whole level under the root node remains untested. For this context and for many other estimation contexts, a normalization step is used to provide a more accurate estimate.

The normalization process is illustrated formulaically beneath the tree. The total tree size in this instance is "31." The sum count at level 3 is "11" (4+7). To get a normalized level to account for the "missing" level, as indicated the left count LT of 4 (the original sum left count) is multiplied by 31/11 to yield an LT estimate of 11.27 as shown. The GT count of 7, by the same logic, is multiplied by 31/11 to yield an overall estimate of 19.72.

Figure 6B:
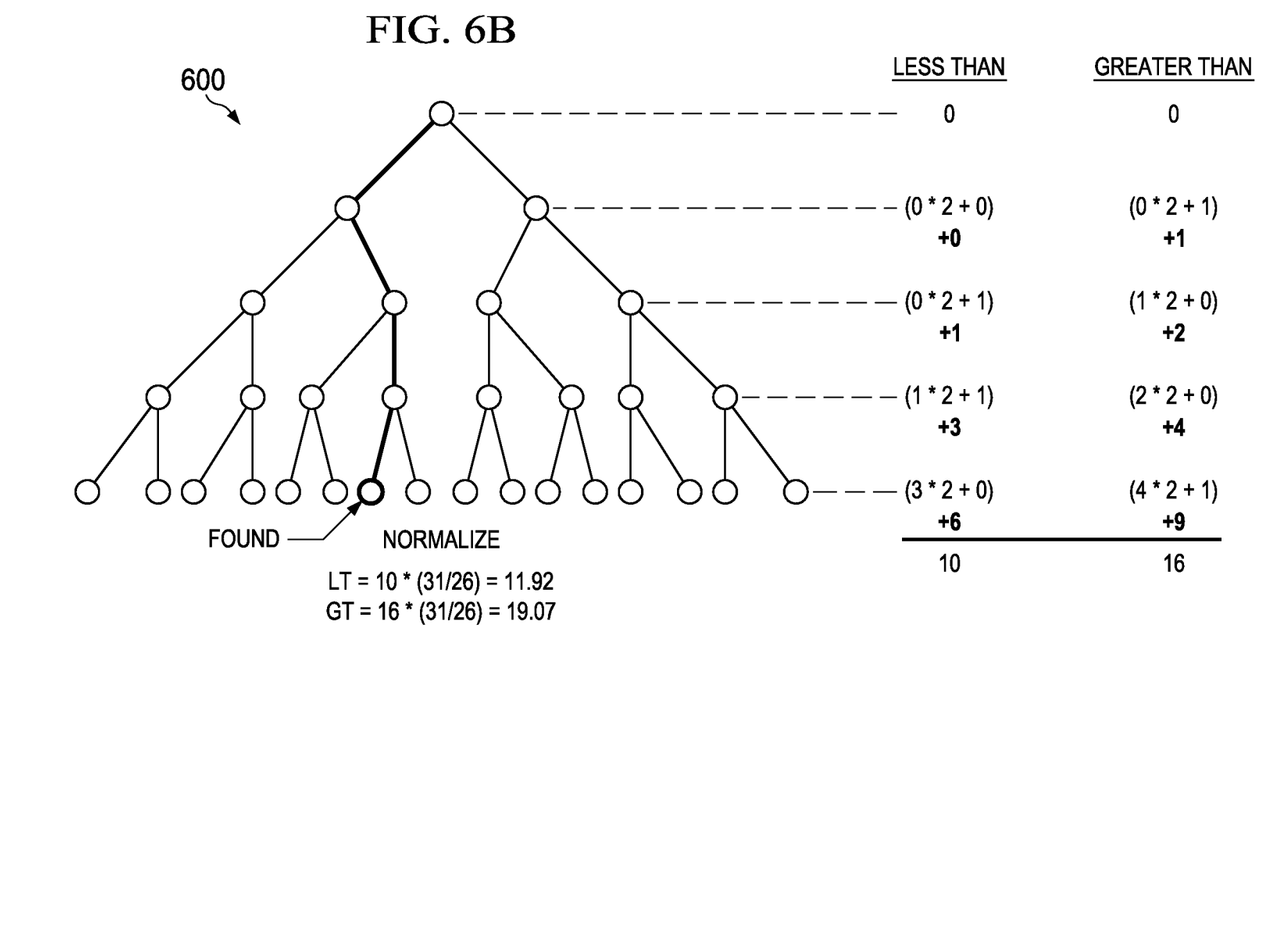

FIG. 6B illustrates a similar process, but where a match was not found at level 3. The approach builds on the computation done at level 3 with a computation done at level 4. The formulas are the same and are applied to this next level. In this instance the normalization process is still used, but since the tree is balanced and is fully traversed, the normalization process has a much smaller effect relative to the running count achieved through traversing the tree.

After traversing the tree, a running estimate of both the LT and GT values may be stored in the main memory database 108 (referring to FIG. 1) so that if a query "A>100" is called, not only will the estimation for "A<100" already be calculated, the estimation for "A>100" will also already be calculated.

Advantageously, the calculated and stored LT and GT values may then be used in the future to re-order a composite query when the sub-queries of the composite query contain different indexes (e.g., A<100 AND B<100). After the trees for both A and B are traversed and the estimations are calculated, the processor 104 (referring to FIG. 1) may reorder the composite query to "B<100 AND A<100" if the "B<100" sub-query has fewer entries that match the query than there are entries that match the "A<100" sub-query. This may help to improve both the efficiency and accuracy of the system 100 (referring to FIG. 1).

Figure 7:
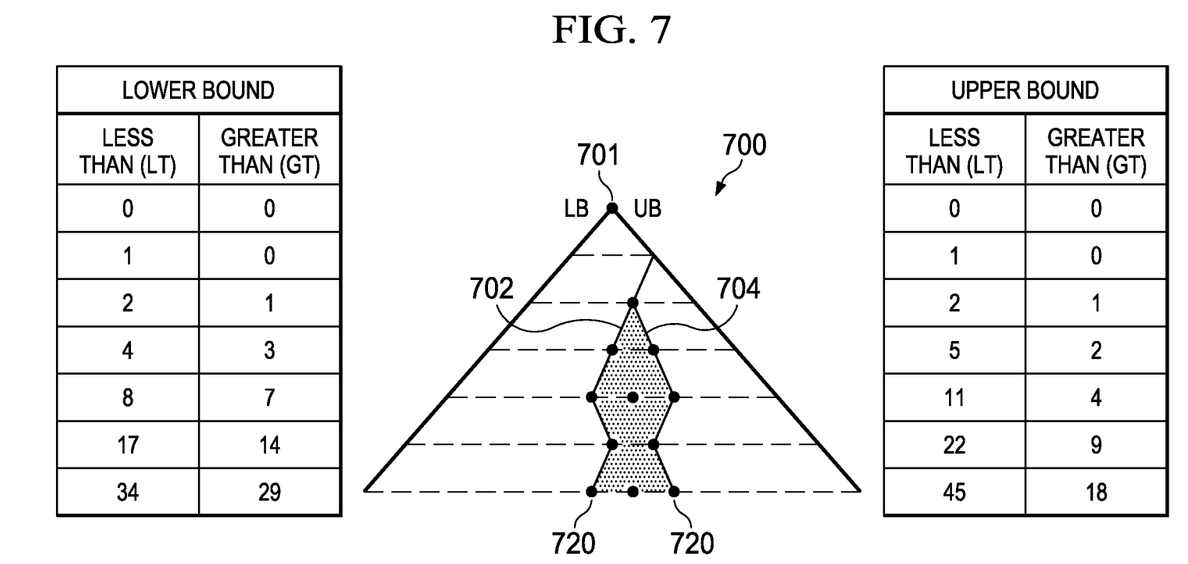
FIG. 7 is an exemplary tree for improved query cost estimation with a single key and two queries, in accordance with the present disclosure.

FIG. 7 is an exemplary tree 700 for the process of FIG. 4 for improved query cost estimation with a single index and two sub-queries. As an example, the tree 700 may be for a single index with two sub-queries for "A>50 AND A<200," where the lower bound key is A=50 and the upper bound key is A=200. With a single index and two sub-queries, the tree 700 may be traversed twice, once for each key. As shown in FIG. 7, at the top level of the tree, the LT and GT values are both set to 0 at the root node 701 for both traversals through the tree 700.

First, the tree 700 is traversed for a lower bound 702, i.e., A>50. At the first level down from the root node 701 while traversing the tree 700, because the key is greater than the current node's key, the current node becomes the root node's right leaf node, the LT value is updated to 1 (0*2+1=1), and the GT value is updated to 0 (0*2=0). At the first level under the root node, the LT and GT values estimate that there is one node less than the key and zero nodes greater than the key for the query A>50.

At the next level while traversing the tree 700, because the key is less than the current node's key, the new current node becomes the old current node's left leaf node, the LT value is updated to 2 (1*2=2), and the GT value is updated to 1 (0*2+1=1). At the second level under the root node, the LT and GT values estimate that there are two nodes less than the key and one node greater than the key for the query A>50.

At the next level while traversing the tree 700, because the key is less than the current node's key, the new current node becomes the old current node's left leaf node, the LT value is updated to 4 (2*2=4), and the GT value is updated to 3 (1*2+1=3). At the third level under the root node, the LT and GT values estimate that there are four nodes less than the key and three nodes greater than the key for the query A>50.

At the next level while traversing the tree 700, because the key is less than the current node's key, the new current node becomes the old current node's left leaf node, the LT value is updated to 8 (4*2=8), and the GT value is updated to 7 (3*2+1=7). At the fourth level under the root node, the LT and GT values estimate that there are eight nodes less than the key and seven nodes greater than the key for the query A>50.

At the next level while traversing the tree 700, because the key is greater than the current node's key, the new current node becomes the old current node's right leaf node, the LT value is updated to 17 (8*2+1=17), and the GT value is updated to 14 (7*2=14). At the fifth level under the root node, the LT and GT values estimate that there are 17 nodes less than the key and 14 nodes greater than the key for the query A>50.

At the next level while traversing the tree 700, because the key is less than the current node's key, the new current node becomes the old current node's left leaf node, the LT value is updated to 34 (17*2=34), and the GT value is updated to 29 (14*2+1=29). At the sixth level under the root node, the LT and GT values estimate that there are 34 nodes less than the key and 29 nodes greater than the key for the query A>50.

Next, the tree 700 is traversed for the upper bound 704, i.e., A<200. At the first level down from the root node while traversing the tree 700, because the key is greater than the current node's key, the current node becomes the root node's right leaf node, the LT value is updated to 1 (0*2+1=1), and the GT value is updated to 0 (0*2=2). At the first level under the root node, the LT and GT values estimate that there is one nodes less than the key and zero nodes greater than the key for the query A<200.

At the next level while traversing the tree 700, because the key is less than the current node's key, the new current node becomes the old current node's left leaf node, the LT value is updated to 2 (1*2=2), and the GT value is updated to 1 (0*2+1=1). At the second level under the root node, the LT and GT values estimate that there are two nodes less than the key and one node greater than the key for the query A<200.

At the next level while traversing the tree 700, because the key is greater than the current node's key, the new current node becomes the old current node's right leaf node, the LT value is updated to 5 (2*2+1=5), and the GT value is updated to 2 (1*2=2). At the third level under the root node, the LT and GT values estimate that there are five nodes less than the key and two nodes greater than the key for the query A<200.

At the next level while traversing the tree 700, because the key is greater than the current node's key, the new current node becomes the old current node's right leaf node, the LT value is updated to 11 (5*2+1=11), and the GT value is updated to 4 (2*2=4). At the fourth level under the root node, the LT and GT values estimate that there are 11 nodes less than the key and 4 nodes greater than the key for the query A<200.

At the next level while traversing the tree 700, because the key is less than the current node's key, the new current node becomes the old current node's left leaf node, the LT value is updated to 22 (11*2=22), and the GT value is updated to 9 (4*2+1=9). At the fifth level under the root node, the LT and GT values estimate that there are 22 nodes less than the key and 9 nodes greater than the key for the query A<200.

At the next level while traversing the tree 700, because the key is greater than the current node's key, the new current node becomes the old current node's right leaf node, the LT value is updated to 45 (22*2+1=45), and the GT value is updated to 18 (9*2=18). At the sixth level under the root node, the LT and GT values estimate that there are 45 nodes less than the key and 18 nodes greater than the key for the query A<200.

After the tree 700 has been traversed for both sub-queries, the cost estimation that satisfies both sub-queries may be calculated. The cost estimation may be calculated in two ways, where both yield the same result.

In the first approach, the cost estimation for A>50 AND A<200 may be calculated using LT values by subtracting the LT value for the lower bound from the LT value for the upper bound. In this example, the LT value from A>200 (upper bound) is 45 and the LT value from A<50 (lower bound) is 34. Thus, the cost estimation for A>50 AND A<200 using the less than approach is 11 (45−34=11).

In the second approach, the cost estimation for A>50 AND A<200 may be calculated using GT values by subtracting the GT value for the upper bound from the GT value for the lower bound. In this example, the GT value from A<50 (lower bound) is 29 and the GT value from A<200 (upper bound) is 18. Thus, the cost estimation for A>50 AND A<200 using the greater than approach is also 11 (29−18=11).

FIG. 7 depicts, in the shaded region, that for the composite query "A>50 AND A<200," there may be 11 entries 720 that satisfy the query. However, after traversing the tree, a running estimate of both the LT and GT values for both A>50 and A<200 may be stored in the main memory database 108 so that if a query using either of the keys 50 or 200 is called, the estimations for those queries will have already been calculated because the tree was already traversed for the keys 50 and 200. When traversing through the tree, the iterator position for each pass is also saved so that the query cost estimation is also the query result. The last point at the base of the tree may be recorded, so that if a particular index is re-used at a later time, the tree may quickly be traversed from the iterator position.

The cost estimation may also be normalized. Thus, assuming a tree size of 127, the cost estimation may be normalized in the following manner.

The lower bound less than count (LB_lt) is accumulated (e.g., LB_lt=0+1+2+4+8+17+34=66) and the lower bound greater than count (LB_gt) is accumulated, i.e., LB_gt=0+0+1+3+7+14+29=54. The lower bound less than count (LB_lt) and the lower bound greater than count (LB_gt) are summed, i.e., LB_lt+LB_gt=66+54=120. The lower bound less than count (LB_lt) is normalized by multiplying the lower bound less than count (LB_lt) by the tree size divided by the sum of the lower bound less than count (LB_lt) and the lower bound greater than count (LB_gt), i.e., N_LB_lt=LB_lt*(tree.size/sum)=66*(127/120)=69.9. The lower bound greater than count (LB_gt) is normalized by multiplying the lower bound greater than count (LB_gt) by the tree size divided by the sum of the lower bound less than count (LB_lt) and the lower bound greater than count (LB_gt), i.e., N_LB_gt=LB_gt*(tree.size/sum)=54*(127/120)=57.2.

The upper bound less than count (UB_lt) is accumulated (e.g., UB_lt=0+1+2+5+11+22+45=86) and the upper bound greater than count (UB_gt) is accumulated, i.e., UB_gt=0+0+1+2+4+9+18=34. The upper bound less than count (UB_lt) and the upper bound greater than count (UB_gt) are summed, i.e., UB_lt+UB_gt=86+34=120. The upper bound less than count (UB_lt) is normalized by multiplying the upper bound less than count (UB_lt) by the tree size divided by the sum of the upper bound less than count (UB_lt) and the upper bound greater than count (UB_gt), i.e., N_UB_lt=UB_lt*(tree.size/sum)=86*(127/120)=91. The upper bound greater than count (UB_gt) is normalized by multiplying the upper bound greater than count (UB_gt) by the tree size divided by the sum of the upper bound less than count (UB_lt) and the upper bound greater than count (UB_gt), i.e., N_UB_gt=UB_gt*(tree.size/sum)=34*(127/120)=36).

The normalized cost estimation may be calculated by subtracting the normalized lower bound less than count (N_LB_lt) from the normalized upper bound less than count (N_UB_lt), i.e., N_UB_lt−N_LB_lt=91.0−69.9=21.2. Alternatively, the normalized cost estimation may be calculated by subtracting the normalized upper bound greater than count (N_UB_gt) from the normalized lower bound greater than count (N_LB_gt), i.e., N_LB_gt−N_UB_gt=57.2−36.0=21.2.

Cost Normalization

Consistent with the normalization process described above with respect to the balanced tree of FIG. 6A, cost normalization can also compensate to provide a semi-balanced tree (e.g., red-black tree). Each tree may have a certain cost to construct the tree and a certain guarantee of balance. The balance guarantee is used to normalize the initial query result estimate. Normalization assumes that while the tree may not be perfectly balanced, the system will know within limits how far out-of-balance the tree may be.

Figure 8:
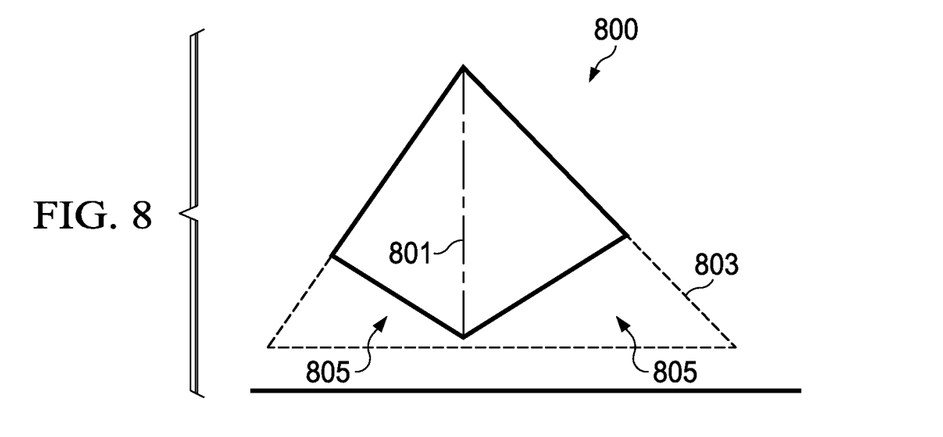
FIG. 8 is a schematic diagram illustrating an out-of-balance tree, in accordance with the present disclosure.

FIG. 8 is a schematic diagram illustrating an out-of-balance tree 800. The out-of-balance tree 800 is an example of the problems that can affect cost estimates and how cost normalization can be applied to compensate for that.

Cost normalization may be used advantageously to compensate for the imbalanced nature of the tree. The long path 801 through the tree is followed down the middle of the tree 800. Thus, as indicated by the dotted lines, assuming that the triangle tree 803 is balanced, the areas 805 on either side of the path 801 through the tree 800 would be estimated to be much larger than they are in actuality. But instead, if the ratio of the "LT" side of the triangle to the "GT" side of the triangle is considered and multiplied with the overall size of the dataset, and if the definitional balance of the tree type (e.g., B-tree, RB tree, B+ tree) is accounted for, a more accurate estimate that is normalized to the known tree format of the data points on either side of the path 801 may be made.

Figure 9:
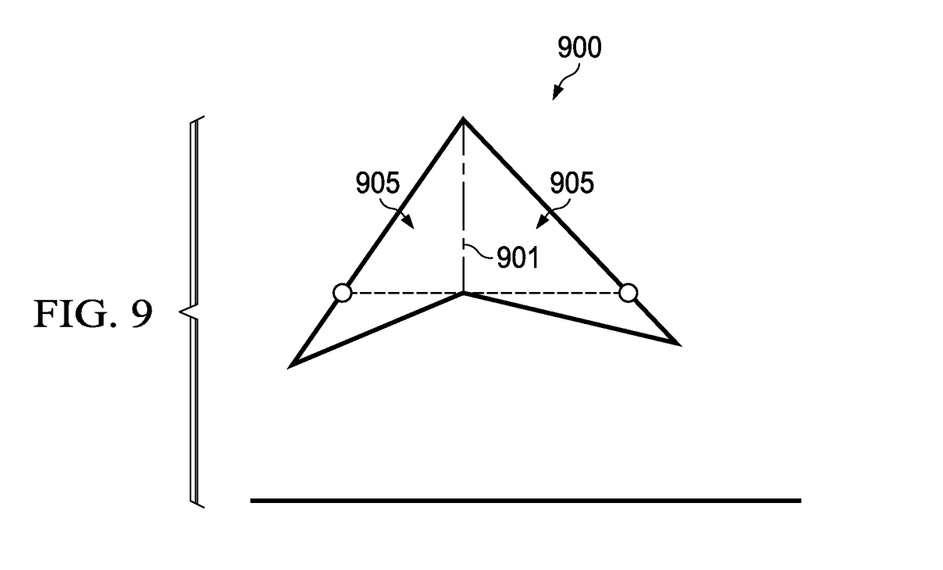
FIG. 9 is a schematic diagram illustrating another out-of-balance tree, in accordance with the present disclosure.

FIG. 9 is a schematic diagram illustrating another out-of-balance tree 900 in which a short path 901 is followed. The unbalanced tree 900 and following a "short" branch/path 901 would result in an underestimation of the number of entries satisfying a query—i.e., the balanced triangles 905 on either side of the path 901 do not include the entire tree 900. Again, by the same token the ratio of each side of the table may be used to provide a normalized value of the estimated size by multiplying the ratio of the two sides to the overall size of the data set.

Normalization is a useful process in the presently described approach even in the context where a tree is perfectly balanced. This is because even a perfect balancing algorithm cannot guarantee all the leaves to exist at the lowest level of the tree. For example, if the tree only has two nodes, there will only be one leaf at the second level. Since the number of nodes in the tree is exponential per level, being off by one level can yield wide errors, so normalization is important even in the case of using a perfect balancing algorithm.

Dealing with Duplicate Keys

One problem with the process and pseudo code of FIGS. 4 and 5 may be that the cost( )function assumes that each key is unique. However, indexes are typically allowed to have multiple entries per key, and, if each key is not unique, traversing the tree may result in collisions. If the collisions are kept in a list under a single node, the tree may not be able to rebalance itself and the cost( )function may not be able to produce bounded estimates. To avoid this problem, it is desired that each key be unique so that the tree can rebalance itself.

Each key may be made unique by appending a unique value to the end of the key. This may be the case for both simple and compound queries. In the compound query context, for example, a key may be a composite query of fields A and B, where the key may be made unique by appending field U to the end of the key and assigning a unique value to U. Because comparisons are made from the left-most field to the right-most field, it is important to append the unique field to the right-most field so that the collisions may fall under the same sub-tree. Since the equivalent keys would then fall under the same sub-tree, upper- and lower-bound search keys may be created and used to estimate the cost of the sub-tree. Appending a random value U to the end of the key may create a more flattened tree, which results in a more balanced tree.

For example, suppose there is a composite index of field A and B and there are one million entries with the same composite key (A=x, B=y). Internally, the processor 104 would append field U to the composite key (A=x, B=y, U=u) so that each entry may be kept under a single node for rebalancing the tree. In another example, suppose there are thousands of entries in a tree with a value of 5, which would create a single node with a sub-container full of values. However, if a random value is appended to the end of each entry, all of the entries are now unique, and a balanced, flattened tree may be built.

Ideally, field U would be a unique value for each entry, but is not required to be a unique entry because query cost estimation may not need to be 100% precise. In addition, the tree rebalancing algorithm may not guarantee perfect balance as some degree of error is acceptable, and field U can therefore be assigned a random value with enough bits to create a high probability of uniqueness.

When handling queries for trees having duplicate entries and the "U" values are applied, the search key should be modified by appending either a maximum value of U+1, or a minimum value of U−1. In the case of searching for "less than" or "greater than or equal to", the minimum value of U−1 should be appended to the search key. In the case of searching for "greater than" or "less than or equal to", the maximum value of U+1 should be appended to the search key. In an embodiment, the search key will then be {k, U+1 or U−1} depending on a range operation being used, and should be compared with the index keys from left to right, so that k is compared first and U is compared next.

To illustrate this point, assume a tree that includes all duplicate keys, say 100 keys of 5 and 100 keys of 6. Then 100 nodes with keys {5, U} and another 100 nodes with keys {6, U} are in the tree. To find "f<=5", one would use the key {5, max U+1} to traverse the tree down the middle between all of the 5 nodes and the 6 nodes. The key would be greater than all of the 5 nodes because of max U+1, but be less than all of the 6 nodes because 5 is less than 6 and the comparison is made from left to right.

One drawback of this approach is the amount of memory used to append the unique value U to each composite key. One solution to this to not append the unique value U to each composite key until a collision occurs, thereby reducing memory use.

N-Ary Trees

Figure 10:
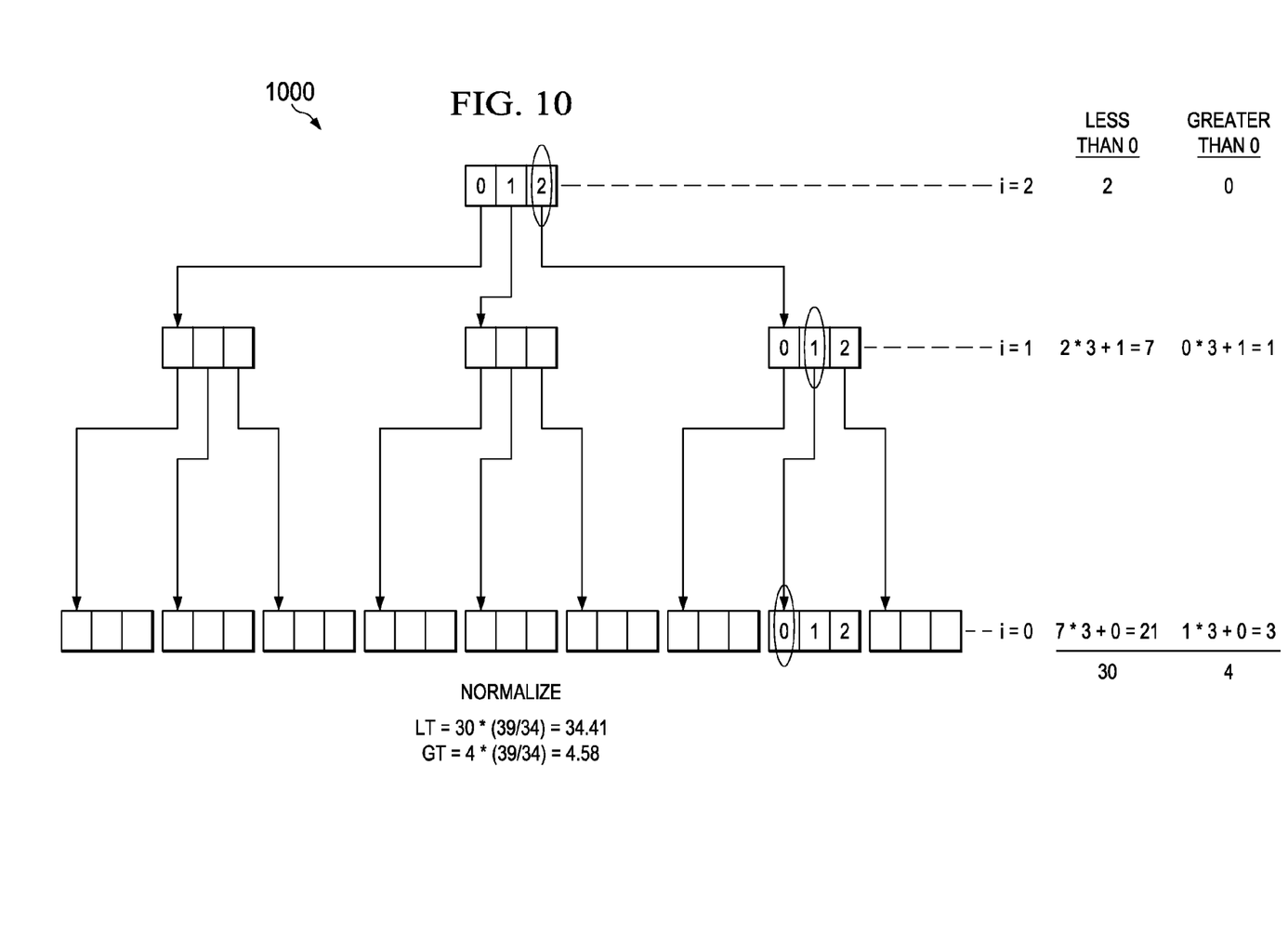
FIG. 10 is an exemplary N-ary tree (a 3-2 tree) in which the disclosed cost estimation approach has been applied.

Also known as a K-ary tree or M-ary tree, an N-ary tree is a tree structure having a known depth, in which some nodes are filled with one or more values. Although this description is in the context of each node having a certain value, the principles of this disclosure can also be applied to the N-ary tree situation by treating the individual values within the N-ary tree nodes as if they were nodes. The estimates can then essentially be multiplied by the number of values within each node, and the other principles described above can be applied in the query handling and estimation tasks described above. This approach is shown in FIG. 10, which is a 3-2 N-ary tree 1000 with the accompanying math adapted from the illustration above with respect to the approach of FIGS. 6A-6B.

Figure 11:
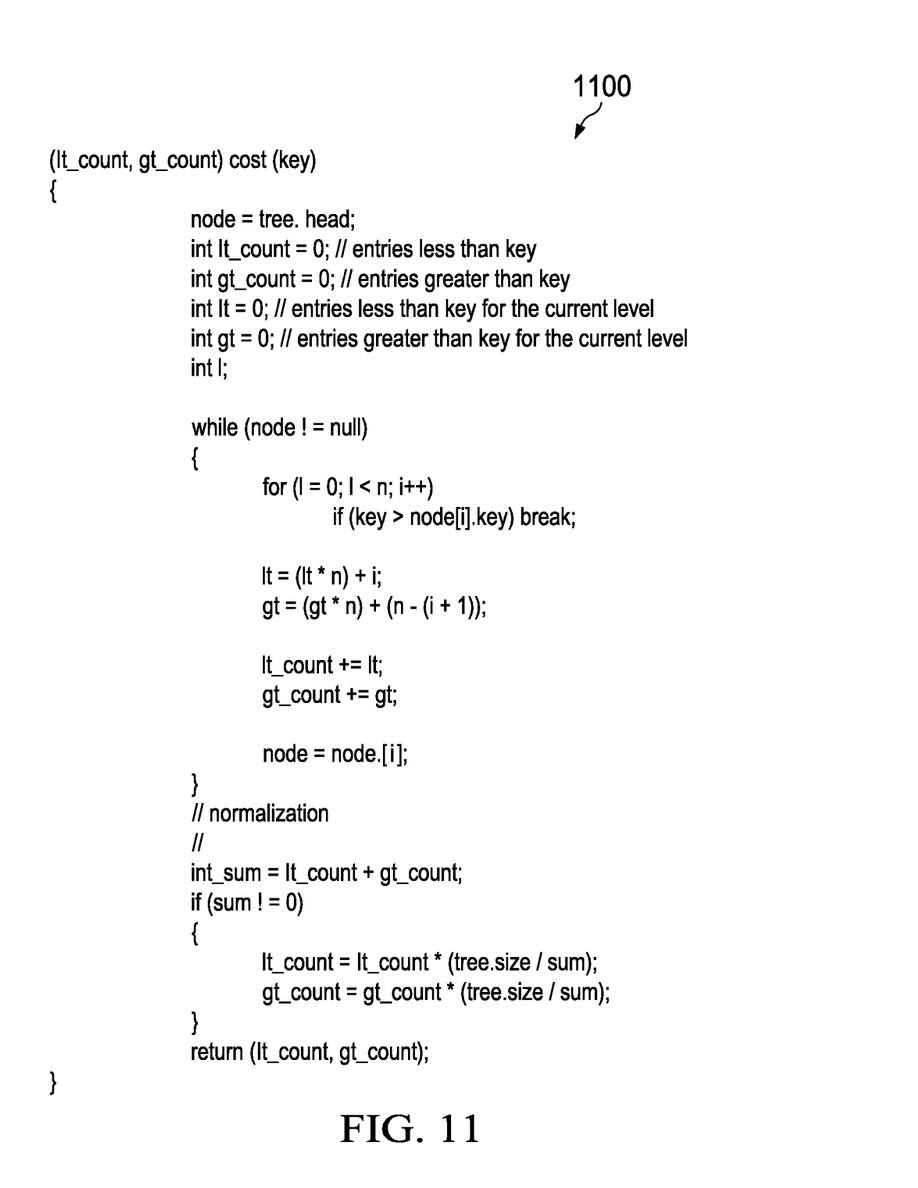
FIG. 11 is a generalized pseudo code approach consistent with that shown in FIG. 3, but adapted for application to N-ary trees.

FIG. 11 provides a generalized pseudo code approach 1100 adapted for application to N-ary trees.

While the foregoing descriptions are in the context of optimizing queries and cost estimations for balanced or semi-balanced trees, the principles could be used in indexes of "unbalanced" trees where, based on the preexisting knowledge of incoming database entry order/distribution, the index would have a relatively known balance. Some of the techniques above could still be used on such trees, even though they are not necessarily balanced/rebalanced, and the normalization would be based on the expected distribution of incoming data.

The preceding detailed descriptions of embodiments have been presented by way of example only, and not by limitation. Thus, the breadth and scope of a preferred embodiment should not be limited by any of the above described exemplary embodiments, but should be defined only in accordance with the claims and their equivalents.

For example, as referred to herein, a machine or engine may be a virtual machine, computer, node, instance, host, or machine in a networked computing environment. Also as referred to herein, a networked computing environment is a collection of machines connected by communication channels that facilitate communications between machines and allow for machines to share resources. Network may also refer to a communication medium between processes on the same machine. Also as referred to herein, a server is a machine deployed to execute a program operating as a socket listener and may include software instances. Such a machine or engine may represent and/or include any form of processing component, including general purpose computers, dedicated microprocessors, or other processing devices capable of processing electronic information. Examples of a processor include digital signal processors (DSPs), application-specific integrated circuits (ASICs), field-programmable gate arrays (FPGAs), and any other suitable specific or general purpose processors.

Memory may store any suitable information. Memory may comprise any collection and arrangement of volatile and/or non-volatile components suitable for storing data. For example, memory may comprise random access memory (RAM) devices, read only memory (ROM) devices, magnetic storage devices, optical storage devices, and/or any other suitable data storage devices. In particular embodiments, memory may represent, in part, computer-readable storage media on which computer instructions and/or logic are encoded. Memory may represent any number of memory components within, local to, and/or accessible by a processor.

Resources may encompass any types of resources for running instances including hardware (such as servers, clients, mainframe computers, networks, network storage, data sources, memory, central processing unit time, scientific instruments, and other computing devices), as well as software, software licenses, available network services, and other non-hardware resources, or a combination thereof.

A networked computing environment may include, but is not limited to, computing grid systems, distributed computing environments, cloud computing environment, etc. Such networked computing environments include hardware and software infrastructures configured to form a virtual organization comprised of multiple resources which may be in geographically disperse locations.

Various terms used herein have special meanings within the present technical field. Whether a particular term should be construed as such a "term of art," depends on the context in which that term is used. "Connected to," "in communication with," or other similar terms should generally be construed broadly to include situations both where communications and connections are direct between referenced elements or through one or more intermediaries between the referenced elements, including through the internet or some other communicating network. "Network," "system," "environment," and other similar terms generally refer to networked computing systems that embody one or more aspects of the present disclosure. These and other terms are to be construed in light of the context in which they are used in the present disclosure and as those terms would be understood by one of ordinary skill in the art would understand those terms in the disclosed context. The above definitions are not exclusive of other meanings that might be imparted to those terms based on the disclosed context.

Words of comparison, measurement, and timing such as "at the time," "equivalent," "during," "complete," and the like should be understood to mean "substantially at the time," "substantially equivalent," "substantially during," "substantially complete," etc., where "substantially" means that such comparisons, measurements, and timings are practicable to accomplish the implicitly or expressly stated desired result.

Additionally, the section headings herein are provided for consistency with the suggestions under 37 CFR 1.77 or otherwise to provide organizational cues. These headings shall not limit or characterize the invention(s) set out in any claims that may issue from this disclosure. Specifically and by way of example, although the headings refer to a "Technical Field," such claims should not be limited by the language chosen under this heading to describe the so-called technical field. Further, a description of a technology in the "Background" is not to be construed as an admission that technology is prior art to any invention(s) in this disclosure. Neither is the "Brief Summary" to be considered as a characterization of the invention(s) set forth in issued claims. Furthermore, any reference in this disclosure to "invention" in the singular should not be used to argue that there is only a single point of novelty in this disclosure. Multiple inventions may be set forth according to the limitations of the multiple claims issuing from this disclosure, and such claims accordingly define the invention(s), and their equivalents, that are protected thereby. In all instances, the scope of such claims shall be considered on their own merits in light of this disclosure, but should not be constrained by the headings set forth herein.

What is claimed is:

1. A system for optimizing database queries and estimating query costs, the system comprising:
    a computer-readable medium having a tree indexed data structure comprising nodes, the computer-readable medium operable to store a computer-readable query optimizer; and
    a processor operable to execute the query optimizer for computing a cost estimate ratio associated with performing a query based at least in part on a key value, the cost estimate ratio comprising a first number of nodes in the tree indexed data structure having values less than the key value versus a second number of nodes in the tree indexed data structure having values more than the key value, and further operable to compute a cost estimation by normalizing the cost estimate ratio relative to a total size of the tree indexed data structure,
    wherein the tree indexed data structure comprises a hierarchical structure with a root node and a plurality of child nodes, and further wherein the tree indexed data structure is traversed with the key value to compute the cost estimate ratio associated with performing the query based at least in part on the key value.

2. A system of claim 1, wherein the nodes comprise stored values that are compared to the key value when the tree indexed data structure is traversed.

3. A system of claim 2, wherein the processor traverses the tree indexed data structure by comparing the key value to the stored values, starting at the root node and traversing the hierarchical structure until a compared node's stored value matches the key value.

4. A system of claim 3, wherein the processor traverses to a left node at a lower level in the hierarchical structure if the stored value of a compared node is less than the key value and traverses to a right node at the lower level if the stored value of the compared node is greater than the key value.

5. A system of claim 4, wherein the processor is further operable to compute a first running total of nodes with values less than the key value and a second running total of nodes with values greater than the key value, and estimates a number of matches present in a left sub-tree and in a right sub-tree for a particular query based on the first and second running totals.

6. A system of claim 5, wherein the cost estimate ratio is based on the first and second running totals.

7. A system of claim 6, wherein the processor computes the cost estimation using the following formulas:

$$\text{estimate of number of nodes with values less than the key} =$$
$$\text{the first number of nodes} \times \frac{\text{the total size of the tree index}}{\text{first running total} + \text{second running total}};$$
and
$$\text{estimate of number of nodes with values greater than the key} =$$
$$\text{the second number of nodes} \times \frac{\text{total size of the tree index}}{\text{first running total} + \text{second running total}}.$$

8. A system of claim 1, wherein the values of each node are unique.

9. A system of claim 8, wherein the processor is further operable to append a unique value to an end of a value in a node to allow for the values of each node to be unique.

10. The system of claim 9, wherein appending the unique value results in a substantially flattened tree.

11. A system of claim 1, where the tree indexed data structure is a balanced tree indexed data structure.

12. A system of claim 1, where in the tree indexed data structure is a semi-balanced tree indexed data structure.

13. A system of claim 1, wherein the tree indexed data structure is an in-memory database structure.

14. A method for optimizing database queries and estimating query costs, the method comprising:
executing, using a computer processor, a computer-executable query optimizer stored in a computer-readable medium, the query optimizer operable for:
computing a cost estimate ratio associated with performing a query based at least in part on a key value, the cost estimate ratio comprising a first number of nodes in a tree indexed data structure having values less than the key value versus a second number of nodes in the tree indexed data structure having values more than the key value, and
computing a cost estimation by normalizing the cost estimate ratio relative to a total size of the tree indexed data structure,
wherein the tree indexed data structure comprises a hierarchical structure with a root node and a plurality of child nodes, and further wherein the tree indexed data structure is traversed with the key value to compute the cost estimate ratio associated with performing the query based at least in part on the key value.

15. The method of claim 14, wherein the nodes comprise stored values, and further comprising traversing the tree indexed data structure by comparing the stored values to the key value.

16. A method of claim 15, further comprising:
traversing, using the processor, the tree indexed data structure by comparing the key value to the stored values, starting at the root node and traversing the hierarchical structure until a compared node's stored value matches the key value.

17. A method of claim 16, further comprising:
traversing to a left node at a lower level in the hierarchical structure if the stored value of a compared node is less than the key value; and
traversing to a right node at the lower level if the stored value of the compared node is greater than the key value.

18. A method of claim 17, further comprising:
computing a first running total of nodes with values less than the key value and a second running total of nodes with values greater than the key value; and
estimating a number of matches present in a left sub-tree and in a right sub-tree for a particular query based on the first and second running totals.

19. A method of claim 18, wherein the cost estimate ratio is based on the first and second running totals.

20. A method of claim 19, wherein computing the cost estimate uses the following formulas:

$$\text{estimate of number of nodes with values less than the key} =$$
$$\text{the first number of nodes} \times \frac{\text{the total size of the tree index}}{\text{first running total} + \text{second running total}};$$
and
$$\text{estimate of number of nodes with values greater than the key} =$$
$$\text{the second number of nodes} \times \frac{\text{total size of the tree index}}{\text{first running total} + \text{second running total}}.$$

* * * * *